Patented Aug. 18, 1925.

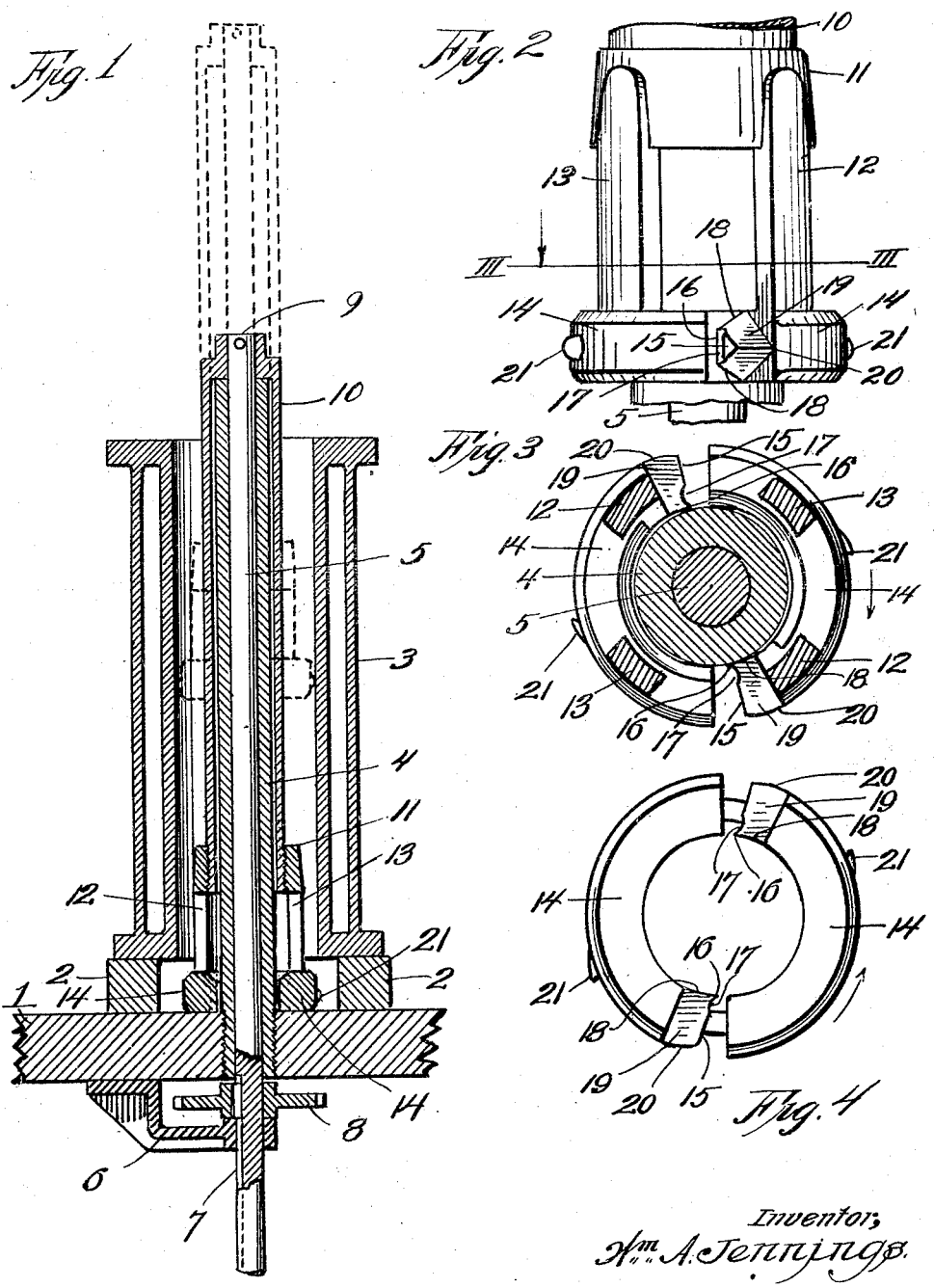

1,549,985

UNITED STATES PATENT OFFICE.

WILLIAM A. JENNINGS, OF RAYTOWN, MISSOURI.

BORING APPARATUS.

Application filed December 3, 1923. Serial No. 678,186.

*To all whom it may concern:*

Be it known that I, WILLIAM A. JENNINGS, a citizen of the United States, and a resident of Raytown, county of Jackson, State of Missouri, have invented a certain new and useful Improvement in Boring Apparatus, of which the following is a complete specification.

This invention relates to cylinder boring apparatus and has for its object to produce a boring device which is provided with an axially arranged guide post yieldingly gripped by a cutter head provided with scraping means for removing excess lubricant and the like from said guide in order that the cutter head may positively maintain center.

Another object is to produce a cutter head in which the bit is so located that it shall exert pressure on the cutter head in a direction tending to force the cutter head to maintain its center.

With the objects named in view, the invention consists in certain novel and useful features of construction and organization of parts as hereinafter described and claimed; and in order that it may be fully understood, reference is to be had to the accompanying drawing, in which:—

Figure 1 is a central vertical section taken through a boring attachment embodying the invention.

Figure 2 is an enlarged side elevation of the cutter head.

Figure 3 is a section on the line III—III of Figure 2.

Figure 4 is an inverted plan view of the cutter head.

In the said drawing, where like reference characters identify corresponding parts in all of the figures, 1 represents any suitable table or other support, and 2 bars forming a base resting on the table and adapted to receive and support a cylinder block 3 which it is desired to bore. Secured to the table 1 and axially alined with the cylinder block 3 and projecting through and beyond the upper end of the same, is a tubular guide or bearing post 4 forming a bearing for a rotatable and slidable shaft 5, the outside surface of said post providing a guide and bearing for a rotatable and slidable cutter head, hereinafter described.

The shaft 5 projects through the table and is provided with a bracket bearing 6 secured to the underside of the table 1, and is formed with a longitudinal key way 7 which is of substantially the same length as the tubular post 4 in order that the shaft 5 may be projected through the post a distance equal to the length of the latter.

Slidably mounted on the shaft 5, but held against rotation through engagement with the key way 7, is a driving wheel 8 interposed between the bracket 6 and the bottom of the table, and the said wheel 8 is adapted to be rotated by any suitable source of power, not shown, for the operation of the shaft 5.

The upper end of the shaft 5 is rigidly secured or pinned as at 9, to the corresponding end of a cylindrical sleeve 10 of slightly greater diameter than the post 4, and said sleeve carries at its lower end a cutter head. The cutter head comprises a ring 11 having two sets of depending arms 12 and 13. Each pair of arms 12 and 13 carry a sector 14, the arms 12 being near the front and the arms 13 near the rear ends of their respective sectors. The inner wall of each sector is of substantially the same radius as the guide post 4, except at the ends where the radial distance originally is slightly less. Because of this construction, the sectors must be sprung outward slightly to force the cutter head down upon the guide post, and thus positioned the ends or extremities of each sector, being of smaller diameter, will tightly engage the guide post and consequently prevent engagement of the intermediate part of the innner wall with said guide post, the parts in normal position standing as shown in Figure 3.

Preliminary to reaming out the bore of a cylinder block or the like, proper lubrication for the bearing of the cutter head on the guide post is essential. Excess lubrication is objectionable as the thickness of the lubricating film, although imperceptible to the eye, results in reaming the bore to a diameter greater than desired, that is to an extent in excess of the desired diameter substantially equal to the thickness of the lubricant on the guide post. It is, therefore, desirable to produce a cutter head which will remove the excess lubricant during the reaming operation, and to accomplish this result the front extremities of the sectors are so formed that they gather up and force outwardly the excess lubricant.

By reference to Figures 2 and 4, inclusive, it will be noted that in advance of arms 12, the sectors are of triangular cross section at 15, the base of each triangle at the front edge at 16, pressing against the guide post and such extremity is accentuated as a scraper by providing the sector with a vertical recess 17. The triangular ends also taper or converge forwardly to permit the surplus lubricant gathering in front of the scraping edge to be picked up by the converging margins 18 and forced upon the side surfaces 19 of the triangular portion and work outwardly to and fall or drip off at the apex or ridge portion 20. This disposal of the surplus lubricant leaves the invisible pores of the guide post with sufficient lubricant to avoid material friction between the sectors and post and the generation of heat from such cause, and the cutters to describe a path of the prescribed diameter in their reaming operation.

It will be understood that the cutter head in moving upward on its reaming operation, mainly utilizes the upper halves of the triangular end portions in the lubricant removing operation, and that when the cutter head is caused to travel in the reverse direction in its reaming operation, the opposite half of each end will be mainly instrumental in removing surplus lubricant from the guide post.

The cutting or reaming blades may be of any preferred or conventional type, those shown at 21, being secured to the sectors in any suitable manner. In practice, the cylinder block 3 is secured in position, and the cutter head is arranged at the top or bottom of the block depending on whether it is desired to bore the cylinder upwardly or downwardly. Power is now applied to the wheel 8, which through the shaft 5 and sleeve 10 will impart rotation to the cutter head. The shaft 5 is fed upwardly or downwardly as preferred through any suitable screw means, not shown.

The cutting blades are so arranged in the sectors that the arms 12 in effect act to pull the blades in a chord to the circumference of the guide post 4, and thus bring about a more effectual hugging or crowding of the cutter head against the post and more effectually holding of center, the arms 13 bracing and aiding in bringing about this effect and avoiding all chattering of the cutter. As the ends of the sectors wear away, the inside bearing faces of such sectors, will gradually more nearly coincide with the arc or curvature of the guide post, and finally said sectors will bear on the sleeve for their entire lengths. It will then be necessary to grind out the sectors between the bearing ends thereof to insure proper removal of surplus lubricant in further use of the cutter head.

It is to be also understood that the scrapers not only remove excess oil, but also scrape the surface clean of any metal dust or scraps which may be left on the surface of the guide post by a prior reaming operation.

From the above description, it will be apparent that I have produced a device of the character described which possesses all of the features of advantage set forth as desirable; and while I have described and claimed the preferred embodiment of the same, it is to be understood that I reserve the right to make all changes properly falling within the scope of the appended claims.

I claim:

1. In a boring mechanism, the combination of a guide post, a cutter head having downwardly extending arms, and a plurality of unconnected cutting sectors carried by said arms, said sectors being in contact with and guided by the guide post.

2. In a boring mechanism, the combination of a guide post, a cutter head comprising a plurality of cutting sectors adapted to rotate around and travel longitudinally of said post; said sectors throughout a portion of their internal circumference being originally of less diameter than said post, and spring arms supporting said sectors and constantly pressing them inwardly against the post.

3. In a boring mechanism, the combination of a guide post, a cutter head comprising a plurality of cutting sectors adapted to rotate around and travel longitudinally of said post; said sectors throughout a portion of their internal circumference being originally of less diameter than said post, corresponding ends of said sectors being formed as scrapers, and spring arms supporting said sectors and constantly pressing them inwardly against the post.

4. In a boring mechanism, the combination of a guide post, a cutter head comprising a ring formed with two sets of depending arms, sectors carried by said arms and pressing against said post at their extremities, and cutting blades carried by said sectors in such a manner that the arms tend to pull said blades in a tangent to the circumference of the post.

5. In a boring mechanism, the combination of a guide post, a cutter head comprising a plurality of cutting sectors adapted to rotate around and travel longitudinally of said post; said sectors throughout a portion of their internal circumference being originally of less diameter than said post, and at their front ends of triangular form provided with scraping edges to gather surplus lubricant from the post, and with sloping surfaces to conduct or divert said lubricant outwardly or away from the post, and spring arms supporting said sectors and constantly pressing them inwardly against the post.

6. In a boring mechanism a guide post, a cutter head, a series of downwardly extending spring arms secured to said head, and a plurality of unconnected cutting sectors carried by the lower ends of said arms and urged inwardly by the arms against said post.

7. In a boring mechanism, the combination of a guide post, a cutter head having a series of downwardly extending spring arms, and cutting sectors carried by said arms, the arc of each cutting sector being less than the arc of the guide post whereby the cutting sectors shall contact with the post only at their extremities.

In witness whereof I hereunto affix my signature.

WILLIAM A. JENNINGS.